US008116383B2

(12) United States Patent
Kuo et al.

(10) Patent No.: US 8,116,383 B2
(45) Date of Patent: Feb. 14, 2012

(54) EFFICIENT ADAPTIVE MODE SELECTION TECHNIQUE FOR H.264/AVC-CODED VIDEO DELIVERY IN BURST-PACKET-LOSS NETWORKS

(75) Inventors: Sy-Yen Kuo, Taipei (TW); Shih-Chia Huang, Taipei (TW)

(73) Assignee: National Taiwan University, Taipei (TW)

(*) Notice: Subject to any disclaimer, the term of this patent is extended or adjusted under 35 U.S.C. 154(b) by 577 days.

(21) Appl. No.: 12/369,753

(22) Filed: Feb. 12, 2009

(65) Prior Publication Data

US 2010/0150253 A1    Jun. 17, 2010

(30) Foreign Application Priority Data

Dec. 11, 2008  (TW) .............................. 97148217 A

(51) Int. Cl.
*H04N 7/12* (2006.01)
*H04N 11/02* (2006.01)
*H04N 11/04* (2006.01)
(52) U.S. Cl. .................................................. 375/240.27
(58) Field of Classification Search .............. 375/240.27
See application file for complete search history.

(56) References Cited

U.S. PATENT DOCUMENTS

2008/0186404 A1\* 8/2008 Bull et al. .................... 348/616

OTHER PUBLICATIONS

Zhou Wang, et al. "Best Neighborhood Matching: An Information Loss Restoration Technique for Block-Based Image Coding Systems," IEEE Trans. on Image Processing, vol. 7, No. 7, pp. 1056-1061, Jul. 1998.
Huifang Sun, et al. "Concealment of Damaged Block Transform Coded Images Using Projections Onto Convex Sets", IEEE Trans. on Image Processing, vol. 4, No. 4, pp. 470-477, Apr. 1995.
Paul Salama, et al. "Error Concealment in Encoded Video Streams", Video and Image Processing Laboratory, School of Electrical and Computer Engineering, Purdue University, West Lafayette, IN.
Shih-Chia Huang, et al. "Optimization of Hybridized Error Concealment for H.264", IEEE Trans. on Broadcasting, vol. 54, No. 3, pp. 499-516, Sep. 2008.

\* cited by examiner

*Primary Examiner* — Edan Orgad
*Assistant Examiner* — Harris Wang

(57) ABSTRACT

A method of an efficient adaptive mode selection for H.264/AVC-coded video delivery in burst-packet-loss networks to generate the image data of the missing macroblocks in the decoded current frame by using the information related to the spatial redundancy in the same frame and the temporal redundancy in the inter frames is disclosed. The method first employs the Intra High-Speed Spatial Error Concealment (SEC) method for the initial frame. For the succeeding inter frames, the Temporal Error Concealment (TEC) method is used when the Adjacent External Boundary Matching Error (AEBME) of the surrounding macroblocks is not more than the dynamic threshold ($DT_\alpha$). The Intra High-Speed SEC is used when AEBME is more than ($DT_\alpha$) and the surrounding macroblocks are all coded intra-method, otherwise the task proceeds by employing Normal SEC.

10 Claims, 16 Drawing Sheets

(a) T1(16×16)

(b) T2(16×8)

(c) T3(8×16)

(d) T4(8×16)

EFFICIENT ADAPTIVE MODE SELECTION TECHNIQUE FOR H.264/AVC-CODED VIDEO DELIVERY IN BURST-PACKET-LOSS NETWORKS

BACKGROUND OF THE INVENTION

1. Field of the Invention

The present invention relates generally to a method of an efficient adaptive mode selection for H.264/AVC-coded video delivery in burst-packet-loss networks, and a hybrid error concealment method, and more particularly, to a method of using spatial redundancy information and temporal redundancy information for concealing a spatial image error of an encoded image frame caused by missing macroblocks.

2. The Prior Arts

Image transmission service including video meeting, website browsing, image file transmission, is a very important service provided by communication and IT enterprises. Typically, an original image file desired to be transmitted is often too large to be effectively transmitted over the internet, or often occupies too much memory space. As such, an image file is often performed with a coding process with a high compression ratio and a low loss ratio before transmission for reducing the size of the image content. Such a coding process may be selected from TIFF, JPEG, MJEP, MPEG, H.264/AVC, in accordance with the demands of the system for the image compression ratio, the loss ratio, so as to obtain an optimal algorithm for static images or continuous images.

However, when being transmitted, the encoded image file is often interfered by the transmission interface or the electrical system of the receiving end. Such interferences usually cause damages or errors of the image file content, so that the receiving end becomes incapable of decoding and recovering the encoded image file back to original by a predetermined corresponding decoding method.

In accordance with psychology of vision, an individual edge would not affect visional recognition. However, such an individual edge may be mutually affected with edges adjacent thereto so as to generate a composition effect. In this concern, human vision is more sensitive to edge distortions. Generally, edge distortions include blurred edges and newly created false edges. As such, it is very important to maintain original edges and avoid the creation of false edges when executing an image process.

A method of recovering or obtaining image content of a missing macroblock according to image content of correct macroblocks of a same frame of the missing macroblock is generally called the SEC method. A further method proposed as another solution is called the temporal error concealment (TEC) method. According to the TEC method, a motion vector of a missing macroblock can be achieved by referring to a correct image data of a previous frame. Then, a reference frame is moved according to the motion vector, and therefore the image data of the missing macroblock can be thus obtained. In such a way, the negative affection to the entire image frame caused by the missing macroblock can be concealed.

The conventional SEC method is schematically introduced firstly as below.

There are many algorithms of conventional technologies have been proposed for spatial error concealment, such as bilinear interpolation (BI), directional interpolation (DI), and best neighborhood matching (BNM). The principles of the aforementioned algorithms can be learnt in more details by referring to related references, such as: P. Salama, N. B. Shroff, and E. J. Delp, "Error concealment in encoded video streams," in Signal Recovery Techniques for Image and Video Compression and Transmission, A. K. Katsaggelos and N. P. Galatsanos, Eds. Norwell, Mass.: Kluwer, ch. 7, 1998; H. Sun and W. Kwok, "Concealment of damaged block transform coded images using projection onto convex set," IEEE Trans. Image Processing, vol. 4, pp. 470-477, April 1995; and Z. Wang, Y. Yu, and D. Zhang, "Best neighborhood matching: An information loss restoration technique for block-based image coding systems," IEEE Trans. Image Process., vol. 7, no. 7, pp. 1056-1061, July 1998. They are to be briefly illustrated herebelow for better understanding of the present invention.

FIG. 1 is a schematic diagram illustrating a BI method according to a conventional technology. Referring to FIG. 1, a missing macroblock 20 having no correct image content is surrounded by edge reference pixels 21 containing correct image content. A missing pixel P(x, y) in the missing macroblock 20 positioned at the coordinates (x, y) of BI is then interpolated by the formula (1), according to the correct image content of the four edges in both horizontal direction and vertical direction:

$$p(x, y) = \frac{p1 \times d2 + p2 \times d1 + p3 \times d4 + p4 \times d3}{d1 + d2 + d3 + d4}, \quad (1)$$

where d1, d2, d3, d4 are relative distances from the edge pixels P1, P2, P3, P4 to the missing pixel P(x, y), respectively.

FIG. 2 is a schematic diagram illustrating a DI method according to a conventional technology. As shown in FIG. 2, the edge pixels contain correct image content, while the macroblock surrounded by the edge pixels is a missing macroblock containing incorrect image content. The pixel P(x, y) in the missing macroblock positioned at the coordinates (x, y) is then interpolated by the formula (2), according to the correct image content of two edges along a specific direction:

$$p(x, y) = \frac{p1 \times d1 + p2 \times d2}{d1 + d2}, \quad (2)$$

where d1, d2 are relative distances from the edge pixels P1, P2, to the missing pixel P(x, y), respectively.

FIG. 3 is a directional schematic diagram illustrating a DI method according to a conventional technology. As shown in FIG. 3, in the DI method, the edge direction is classified into 8 directions, in which DI(0°) represents a direction of 0°, DI(22.5°) represents a direction of 22.5°, . . . and so forth. P1 and P2 of FIG. 2 are each of one of the 8 directions.

The conventional DI method usually employs a direction filter of an edge direction detection technique for determining direction of each pixel contained in the macroblocks surrounding the missing macroblock. Sobel operator or Prewitt operator are often used. Sobel operator, which is also known as a Sobel filter, is to be exemplified for illustration below taking a 3×3 Sobel operator as an example:

$$S_x = \begin{bmatrix} -1 & 0 & 1 \\ -2 & 0 & 2 \\ -1 & 0 & 1 \end{bmatrix} \quad (3)$$

-continued $$S_y = \begin{bmatrix} -1 & -2 & -1 \\ 0 & 0 & 0 \\ 1 & 2 & 1 \end{bmatrix}$$

where Sx and Sy detect edge characteristics at X direction and Y direction, respectively, and obtain directional gradients at X direction and Y direction of equation (4) ($G_x$ and $G_y$), respectively.

$$G_x = X_{i+1,j-1} - X_{i-1,j-1} + 2X_{i+1,j} - 2X_{i-1,j} + X_{i+1,j+1} - X_{i-1,j+1}$$

$$G_y = X_{i-1,j+1} - X_{i-1,j-1} + 2X_{i,j+1} - 2X_{i,j-1} + X_{i+1,j+1} - X_{i-1,j-1} \quad (4).$$

A directional gradient (Grand) and a directional angle (θ) can be further calculated with equations (5) and (6).

$$\text{Grand} = \sqrt{G_x^2 + G_y^2} \quad (5)$$

$$\theta = \tan^{-1}(Gx/Gy) \quad (6)$$

where the directional gradient (Grand) is a quantity factor for evaluating the strength of the directivity. In other words, a directional angle (θ) having a maximum directional gradient (Grand) is selected serving as a direction reference for the missing macroblock.

If all of the directional gradients (Grand) are too low, or even lower than a threshold, the missing macroblock is determined as having no directivity, and not adapted for SEC by DI method. As such, other methods, (e.g., BI method), are demanded for processing those missing macroblocks having no directivity.

FIG. 4 is a schematic diagram illustrating a BNM method according to a conventional technology. Referring to FIG. 4, a missing macroblock 20 of frame 40 is surrounded by a plurality of reference macroblocks 22, and a best matching macroblock 32 is surrounded by a plurality of target macroblocks 30 in a searching area 42. The BNM method is for finding out the best matching macroblock 32 for replacing the missing macroblock 20. The BNM method includes the steps of: (1) taking N-pixel-wide boundary surrounding the missing macroblock as a searching image; (2) identifying best matching macroblocks nearest to the missing macroblock; and (3) replacing the corresponding missing macroblock (i.e., the macroblock surrounded by the best matching macroblocks) with the identified best matching macroblock.

Features of the BI method, ID method, and BNM method are to be discussed below in further details.

The DI method has the advantages of edge protection. For example, if there is only one strong edge near the missing macroblock, the original strong edge can be preserved and avoided from becoming blur. However, when there are several edges near the missing macroblock, the DI method may generate several false edges. Unfortunately, human vision is usually very sensitive to blur false edges. Correspondingly, the BI method is adapted to generate new blur false edges. However, if there is only one strong edge near the missing macroblock, the BI method may blur the original strong edge because the edges of the missing macroblock are interpolation processed and mixed with the adjacent pixels. Further, with respect to missing macroblocks having patterns of higher complexity, it is often difficult to obtain necessary effective reference blocks. Although the BNM method can recover the complex missing macroblock, it may cause edge discontinuity. It may also cause higher computation complexity than BI and DI methods, and thus is featured with a lower overall efficiency.

Further, a multi-direction interpolation (MDI) method has been proposed for preserving multi-directional edges. The MDI method is as discussed below.

FIG. 5 is a schematic diagram illustrating reference blocks of the MDI method. Referring to FIG. 5, the MDI selects a plurality of N-pixel-wide boundary reference blocks 50 as a reference block group surrounding a missing macroblock 20.

First, a Sobel operator is used to calculate a directional strength (i.e., directional gradient) and a directional angle of individual pixels of the 4×4 reference block as of the DI method. And then, a directional entropy (DE) $H_d$ is calculated according to equation (7) for representing a directional factor.

$$H_d = -\Sigma p(d_x)\log_2 p(d_x) \quad (7),$$

where $d_x$ represents a directional angle of a specific pixel of the reference block, while p(dx) represents a directional probability density function related to the directional angle.

A greater DE indicates a smaller directivity (i.e., having no specific edge direction), while a maximum DE value (i.e., 1) indicates absolutely evenly distributed edge directions.

Then, a direction threshold β is calculated according to equation (8), for obtaining an overall directional index of the 4×4 reference block. Thus the overall directional index can be accorded to determine whether to adopt the directional angle of the reference block as the directional angle of the missing macroblock group.

$$\beta = \frac{-\sum p(d_x)\log_2 p(d_x)}{\text{Max}(H_d)}, \quad (8)$$

where Max($H_d$) represents a maximum value of $H_d$.

Only when the direction threshold β is smaller than a specific threshold determining value, the directional angle is adopted, and when the direction threshold β is greater than the specific threshold determining value, the missing macroblock is determined as having no specific directivity. According to an aspect of the embodiment, the direction threshold β is preferably defined between 0.7 and 0.9. as such, the reference block group can be classified into four categories according to the direction threshold β, including no-directional background area, single-directional edge area, multi-directional edge area, and complex multi-directional edge area. With respect to reference blocks of different categories, different interpolation methods or matching methods are employed for recovering the missing macroblock. Specifically, the BI method is applied to the no-directional background area; the DI method is applied to the single-directional edge area; the BNM method is applied to the multi-directional edge area; and the MDI method is applied to the complex multi-directional edge area.

When the 4×4 reference block exhibits more than two strong edge directions, the missing macroblock is considered as a multi-directional edge area. In this case, the missing macroblock is recovered by calculating missing pixels of the missing macroblock by interpolation according to the directivity of the 4×4 reference block. According to an aspect of the embodiment, the MDI method is a 3-directional weighted interpolation method, compensating along a horizontal direction, a vertical direction, and a 45° direction. FIG. 6 is a schematic diagram illustrating a 3-directional weighting interpolation of the MDI method according to a conventional technology. Referring to FIG. 6, the missing pixels P are recovered according to the two horizontal pixels PH1 and PH2 at the horizontal direction, the two vertical pixels PV1 and PV2 at the vertical direction, and the two diagonal pixels PD1 and PD2 at the diagonal direction. If the missing pixels P do not have a corresponding strong edge direction, the missing macroblock can be interpolated along the same direction corresponding to that of the nearest missing pixel. In this concern, the MDI method is similar to the DI method.

When most 4×4 reference blocks exhibit more than two strong edge directions, while the direction threshold β is greater than the threshold determining value, the missing macroblock is classified as a complex multi-directional edge area. If the missing macroblock includes complex content, the BNM method may be an ideal one for reconstructing the block to achieve an optimal image quality. However, the BNM method also requires a very large amount of calculation and a very long calculation time. On another hand, although requiring for a smaller calculation amount, the BI method is adapted for maintaining to display an ordinary image quality only.

All above-discussed methods are categorized as ordinary conventional SEC methods. Below, a fast MDI method is to be specifically introduced in more details.

Generally, the MDI method often spends 40% to 90% of calculation time in searching for possible directional angle and directional gradient. However, related directional data of the missing macroblock of the transmitted image would have been recorded during the original coding process. As such, the recorded data contained in the original coding can be used for reducing the calculation amount and saving the calculation time. In H.264/AVC coding, there is a correlation between intro-predication methods and edge direction. For example, an eight-directional 4×4 prediction method and a three-directional 16×16 prediction method can be used for pre-estimating for the edge direction of real images. Intra prediction information of the H.264/AVC contains data related to the original macroblock direction. As such, the fast MDI method of the present invention employs another fast estimation method, for determining whether to use the directional data of the missing macroblock contained in the original coding, so as to execute a direct interpolation. In such a way, it can reduce the complexity of the process of edge direction detection by 70% to 95% on average, and thus drastically improving the decoding efficiency.

FIG. 7 is a flow chart illustrating a fast classification of a fast SEC method according to a conventional technology. Referring to FIG. 7, missing macroblocks are classified into two categories, flat region 53 and compound region 54, according to the intra prediction method information 51 of the original coding. Missing macroblocks in the flat region 53 are to be compensation processed by DI or BI method according to the intra prediction method information, while missing macroblocks in the compound region 54 are to be compensation processed by the aforementioned method.

With respect to the six neighbor blocks of each missing macroblock (i.e., top, top-right, left, right, bottom, and bottom-left), there are at least five adjacent macroblocks chosen via 16×16 prediction method. It does not need to use any Sobel operator to detect the edge direction for a smooth region of an image. On the contrary, each pixel of the missing macroblocks can be interpolated along a single direction (e.g., vertical, horizontal, or diagonal) or bi-direction (vertical-horizontal) determined by majority decision based on the intra 16×16 prediction method including method 0 (vertical), method 1 (horizontal), method 3 (plane), and method 2(DC), of corresponding surrounding macroblocks.

As to the compound region, in a 16×16 and 4×4 mixing prediction method of the reference macroblocks, four-pixel-wide boundary is disjoined into 4×4-pixel blocks as shown in FIG. 8. For the purpose of ascertaining dominant edges of each 4×4-pixel block, the intra method information and a small amount of the edge direction filters (i.e., Sobel filters) are employed). The calculation order of the Sobel filter to estimate the directional angles and directional gradients of an inner layer of pixels, p1, p2, p3, and p4, is depicted in FIG. 8. The calculation is stopped if a desired block is obtained. For each 4×4-pixel block, edge detection begins from p1 and p2. If at least one of p1 and p2 exhibits a strong edge in the same direction of the intra method information, the block is determined as the desired block. If none of p1 and p2 exhibits a strong edge, p3 and p4 are further calculated. As to the intra DC prediction method, the 4×4-pixel block is directly regarded as having no strong edge, and thus does not need a Sobel filter. The final stage is similar as the foregoing embodiment of SEC method of the present invention, in which the missing macroblocks can be classified into four categories, including: no-directional background area 55, single-directional edge area 56, multi-directional edge area 57, and complex multi-directional edge area 58. Different categories are adapted for different interpolation methods. Specifically, the BI method is applied to the no-directional background area; the DI method is applied to the single-directional edge area; the BNM method is applied to the multi-directional edge area; and the MDI method is applied to the complex multi-directional edge area.

All of the above-discussed methods are called conventional intra high-speed SEC methods.

And now, the conventional TEC methods are to be discussed herebelow.

In conventional TEC methods, a zero motion vector, neighboring motion vectors (motion vectors), an available motion vector of a spatially corresponding macroblock in a previous frame, or a median (or an average) of spatially adjacent motion vectors can be used. A TEC method called motion field interpolation method is recently proposed. According to the motion field interpolation method, a best motion vector is determined from the above candidate motion vectors by the boundary matching algorithm (BMA), which calculates the minimum sum of absolute differences (SAD) along the one-pixel-wide boundary between the missing macroblock and its candidate replacements in the H.264 JM decoder.

However, the conventional technology usually calculates an optimal motion vector by complex computation, which requires a large amount of computation and consumes much time, and negatively affects the overall decoding efficiency.

It is assumed that all missing macroblocks have been accurately detected, and all boundary blocks surrounding the missing macroblock contain correct image data including motion vectors. Referring to FIG. 9, there is shown a flow chart illustrating a conventional TEC method. The flow chart includes steps S100 through S180, to be discussed in more details herebelow.

First, at step S100, an optimal regression (OR) plane is set up according to motion vectors of the boundary blocks. An N-pixel-wide block group surrounding the missing macroblock includes a plurality of N×N pixel-wide blocks, in which N is a positive integer. As shown in the drawing, the embodiment is exemplified with N=4 for illustration. However, in other embodiments, N can be any other positive integers other than 4.

FIG. 10 is a schematic diagram illustrating boundary blocks according to a conventional technology. Referring to FIG. 10, it shows a missing macroblock 20 including 16 missing blocks, i.e., DB1, DB2, ..., DB16. The missing blocks are surrounded by 16 boundary blocks, i.e., BB1, BB2, ..., BB16. Further, each of the boundary blocks BB1, BB2, ..., BB16, has a corresponding motion vectors, MV1 through MV16, respectively, for representing a temporal correlation with a previous frame.

For convenience of illustration, a coordinate system is set up in FIG. 10, in which a center of the missing macroblock 20 is set as an origin of coordinate, i.e., P0 (0, 0), and a pixel is defined as a unit of length. In this case, coordinates of the boundary blocks BB1 through BB16 are respectively:

$$BB1(x_1, y_1)=(-6, 10)$$

$$BB2(x_2, y_2)=(-2, 10)$$

$$BB3(x_3, y_3)=(2, 10)$$

$$BB4(x_4, y_4)=(6, 10)$$

$$BB5(x_5, y_5)=(10, 6)$$

$$BB6(x_6, y_6)=(10, 2)$$

$$BB7(x_7, y_7)=(10, -2)$$

$$BB8(x_8, y_8)=(10, -6)$$

$$BB9(x_9, y_9)=(6, -10)$$

$$BB10(x_{10}, y_{10})=(2, -10)$$

$$BB11(x_{11}, y_{11})=(-2, -10)$$

$$BB12(x_{12}, y_{12})=(-6, -10)$$

$$BB13(x_{13}, y_{13})=(-10, -6)$$

$$BB14(x_{14}, y_{14})=(-10, -2)$$

$$BB15(x_{15}, y_{15})=(-10, 2)$$

$$BB16(x_{16}, y_{16})=(-10, 6);$$

and the motion vectors thereof are marked at centers of the corresponding boundary blocks.

The OR plane is constructed by a multiple polynomial regression model of equation (9): $Z(x,y)=c+a_1 x-a_2 x^2+b_1 y+b_2 y^2$, where Z represents the motion vectors, and $a_1, a_2, b_1, b_2$, c are coefficients to be determined.

After regression analysis, an equation (10) as following can be obtained.

$$Z(x, y) = \left[\frac{1}{106496} \sum_{i=1}^{16} MV_i \cdot (27x_i^2 + 25y_i^2 - 3120)\right] \quad (10)$$

$$x^2 + \left[\frac{1}{960} \sum_{i=1}^{16} MV_i \cdot x_i\right] x + \left[\frac{1}{106496} \sum_{i=1}^{16} MV_i \cdot (25x_i^2 + 27y_i^2 - 3120)\right]$$

$$y^2 + \left[\frac{1}{960} \sum_{i=1}^{16} MV_i \cdot y_i\right] y - \frac{1}{512} \sum_{i=1}^{16} MV_i \cdot (15x_i^2 + 15y_i^2 - 1832)$$

A curved plane defined by the equation (10) is the desired OR plane. FIG. 11 is a schematic diagram illustrating boundary blocks according to a conventional technology. As shown in FIG. 11, at step S110, corresponding predicted spatial motion vectors of the missing blocks DB1 through DB16 can be obtained by the equation (10).

At step S120, temporal motion vectors are set up according to a previous image frame, i.e., taking motion vectors of the missing macroblock in the previous image frame at corresponding positions as high temporal correlated motion vectors.

At step S130, candidate motion vectors are constructed according to the boundary matching algorithm (BMA). As discussed above, the spatial motion vectors are obtained at step S110, the temporal VMs are obtained at step S120, and now at the current step, a quantitative difference between each spatial motion vector and each temporal motion vector can be estimated by the adjacent external boundary matching errors (AEBME). The motion vector having a least AEBME is selected as the candidate motion vector.

FIG. 12 is a schematic diagram illustrating a boundary matching algorithm (BMA) and related blocks according to a conventional technology. Referring to FIG. 12, the 16 missing blocks of the missing macroblock 20 are renamed with A00, A01, A110, A11, B00, B01, B10, B11, C00, C01, C10, C11, D00, D01, D10, D11, for the convenience of illustration.

The missing blocks A11, B11, C11, D11 are located at an inside layer of the missing macroblock 20, and are not neighboring to the boundary blocks having correct image data. The rest missing blocks locate at an outside layer of the missing macroblock 20, and are neighboring to the boundary blocks having correct image data. In the current embodiment, only the missing blocks A00, A01, A10, A11 are illustrated, and the other missing blocks can be learnt by referring to the illustration of the missing blocks A00, A01, A10, A11, according to the symmetrical relation between the missing blocks.

The missing block A00 is neighboring to the correct boundary blocks BB1 and BB16, and an AEBME$_{00}$ value can be obtained according to equation (11):

$$AEBME_{00} = \sum_{i=1}^{M} \sum_{x=x_0}^{x_0+N-1} |A_{00}(x, y_0 + i) - R(x + v, y_0 + i + u)| + \quad (11)$$

$$\sum_{i=1}^{M} \sum_{y=y_0}^{y_0-(N-1)} |A_{00}(x_0 - i, y) - R(x_0 - i + v, y + u)|,$$

where $A_{00}(x, y)$ represents the pixels of the missing block A00 in the present frame, R(x, y) represents the pixels of the previous frame, $(x_0, y_0)$ is the coordinate of the missing block A00, (v, u) represents the spatial or temporal motion vector, N represents a quantity of the missing blocks (i.e., 4 in the current embodiment), and M represents a pixel width of the external boundary (i.e., 4 pixels in the current embodiment).

The missing block A10 is neighboring to the boundary blocks BB15, and an AEBME$_{10}$ value can be obtained according to equation (12):

$$AEBME_{10} = \sum_{i=1}^{M} \sum_{y=y_0}^{y_0-(N-1)} \left| \begin{array}{l} A_{10}(x_0 - i, y) - \\ R(x_0 - i + v, y + u) \end{array} \right|, \quad (12)$$

where $A_{10}(x, y)$ represents the pixels of the missing block A10 in the present frame. Similarly, an AEBME$_{01}$ value of the missing block A01 neighboring to the boundary block BB2 can be obtained in like manner.

The missing blocks A11, B11, C11, D11 in the inside layer are not neighboring to any blocks having correct image data, and therefore they are determined with candidate motion vectors by majority decision according to missing blocks adjacent thereto.

At step S140, according to a complexity of each candidate motion vector of the missing macroblock, the missing blocks are divided into a plurality of sub-macroblocks having optimal sizes, e.g., sub-macroblocks having 16×16, 16×8, 8×16, or 8×8 pixels as shown in FIG. 13, in which T1 represents 16×16 sub-macroblocks, T2 represents 16×8 sub-macroblocks, T3 represents 8×16 sub-macroblocks, and T4 represents 8×8 sub-macroblocks. According to the Laplacian distribution of the motion field constituted by the candidate motion vectors, one having the maximum probability is selected from the T1, T2, T3, and T4 sub-macroblocks by Bayes principle. If the missing macroblock has a relatively regular motion, then larger sub-macroblocks, e.g., sub-macroblocks of 16×16 pixels, are more suitable for subsequent motion refinement. On the contrary, if the missing macroblock has a relatively complex motion, the smaller sub-macroblocks, e.g., sub-macroblocks of 8×8 pixels, are more suitable for subsequent motion refinement.

The sub-macroblock having the maximum probability can be determined by equation (13):

$$\hat{T} = \max\{P(T_j \mid mv)\}, j \in \{1, 2, 3, 4\} = \max\left\{\frac{P(T_j \cap mv)}{P(mv)}\right\} \quad (13)$$

$$= \max\left\{\frac{P(mv \mid T_j)P(T_j)}{P(mv)}\right\},$$

where $P(T_j)$ represents a probability of a sub-macroblock $T_j$, and mv represents a motion vector motion vector.

Equation (13) can be further expressed in a form of equation (14):

$$\hat{T}' = \max\{P(mv \mid T_j)\} \quad (14)$$

$$= \max\left\{\prod_{k=1}^{N_j} P(mv_k \mid B_{k,j})\right\}$$

$$= \max\left\{\prod_{k=1}^{N_j} \left[\prod_{mv_k \in B_{k,j}} P(mv_k^x \mid B_{k,j}) \cdot P(mv_k^y \mid B_{k,j})\right]\right\},$$

where $B_{k,j}$ represents the $k^{th}$ partition in the sub-macroblock $T_j$, $mv_k$ represents the motion vectors of the partition $B_k$, $mv_k^x$ represents a horizontal component of the motion vector $(mv_k)$, $mv_k^y$ represents a vertical component of the motion vector $(mv_k)$, $N_j$ represents the number of partitions in the missing macroblock, where $N_j=1$ corresponding to $T_1$, $N_j=2$ corresponding to $T_2$, $N_j=2$ corresponding to $T_3$, and $N_j=4$ corresponding to $T_4$.

According to equation (14), equation (15) can be obtained based on the Laplacian distribution of the motion field:

$$\hat{T}' = \max\left\{\prod_{k=1}^{N_j} \left[\prod_{mv_k \in B_{k,j}} P(mv_k^x \mid B_{k,j}) \cdot P(mv_k^y \mid B_{k,j})\right]\right\} \quad (15)$$

$$= \max\left\{\prod_{k=1}^{N_j} \left[\prod_{mv_k \in B_{k,j}} \frac{1}{2\sigma_k^x}\exp\left(\frac{-|mv_k^x - \mu_k^x|}{\sigma_k^x}\right) \cdot \frac{1}{2\sigma_k^y}\exp\left(\frac{-|mv_k^y - \mu_k^y|}{\sigma_k^y}\right)\right]\right\}$$

where $\mu_k^x$ represents the average horizontal component, $\mu_k^y$ represents the average vertical component, while $\sigma_k^x$ and $\sigma_k^y$ can be expressed by:

$$\sigma_k^x = \frac{1}{\sqrt{2}a}\sum_{mv_k \in B_{k,j}} |mv_k^x - \mu_k^x|; \mu_k^x = \text{median}\{mv_k^x\}$$

$$\sigma_k^y = \frac{1}{\sqrt{2}a}\sum_{mv_k \in B_{k,j}} |mv_k^y - \mu_k^y|; \mu_k^y = \text{median}\{mv_k^y\}.$$

When taking a natural log to the above equation, equation (16) is obtained as following:

$$\hat{T}' \approx \max_j\left\{\sum_{k=1}^{N_j} (-a\ln\sigma_k^x - a\ln\sigma_k^y)\right\}.$$

At step S150, motion refinements are applied to the motion vectors of the sub-macroblocks of the missing macroblock. An adaptive search range (ASR) is obtained according to a first adjacent external boundary matching error (AEBME) at the starting point of a spiral scanning path, along with all of the motion vector values. If the ASR is equal to or less than a threshold value, the motion vector is taken as a motion vector of the missing macroblock, and the threshold value is determined by a proximity of the AEBME value to an original residual value of a sum of absolute differences (SAD).

The ASR is determined by equation (17) according to the AEBME:

$$ASR = \frac{|AEBME(u, v) - \mu|}{\mu} \times \max(D_x, D_y) \times \frac{W}{\lambda} + \varepsilon, \quad (17)$$

where AEBME(u, v) represents the first adjacent external boundary matching error at the starting point, $\mu$ represents the original residual values of the SAD, W represents the maximum search size, and $\lambda$ and $\epsilon$ are constant factors ($\lambda=32$ and $\epsilon=0$). Further, $D_X$ and $D_Y$ can be expressed by equation (18):

$$D_X = \max|X(MVs) - u|$$

$$D_Y = \max|Y(MVs) - v| \quad (18),$$

where X(MVs) represents the X component of the motion vector, and Y(MVs) represents the Y component of the motion vector.

The dynamic threshold ($DT_\alpha$) is expressed by equation (19):

$$DT_\alpha = \mu + N \times \alpha \quad (19),$$

where N is the total number of pixels, and $\alpha$ is a constant factor for each pixel.

Generally, $\mu$ is unavailable, and therefore $\alpha$ is needed in addition for calculating the dynamic threshold ($DT_\alpha$).

FIG. 14 is a schematic diagram illustrating a spiral scanning path according to a conventional technology. Referring to FIG. 14, the spiral scanning path starts from a starting point marked with 0 (in the current embodiment, the starting point is an average motion vector of the candidate motion vectors), in sequence along indication of the arrows, to sequentially perform refinement, so as to search for the best motion vector. For example, the motion vector shown in FIG. 14 marked with 2 represents a desired motion vector, and therefore the motion refinement process processes only three motion vectors. The rest motion vectors are not to be further processed, and therefore the total computation for searching comparison process can be saved. The spiral scanning path saves processing time.

Finally, at step S180, the image data of the missing macroblock can be obtained by moving the candidate macroblock to the position of the missing macroblock according to the motion vector, and thus concealing the negative affection caused by the missing macroblock to the entire image frame.

More details of the conventional TEC methods, ordinary SEC methods and intra high-speed SEC method can be learnt by referring to the publication "Optimization of Hybridized Error Concealment for H.264", IEEE TRANSACTIONS ON BROADCASTING, VOL. 54, NO. 3, SEPTEMBER 2008.

Although having an efficiency higher than the SEC method, the TEC method cannot be applied when the scenario changes, the image moves fast, the image moves irregularly, or an object appears or disappears, because there is no correct frame having temporal correlation available for reference. As such, a method of an efficient adaptive mode selection for H.264/AVC-coded video delivery in burst-packet-loss networks, and a hybridized error concealment method are highly desired, of improving the overall decoding efficiency and performance.

SUMMARY OF THE INVENTION

A primary objective of the present invention is to provide a method of an efficient adaptive mode selection for H.264/AVC-coded video delivery in burst-packet-loss networks to generate the image data of the missing macroblocks (macroblocks) in the decoded current frame by using spatial redundancy information in the same frame and the temporal redundancy information in the inter frames. The method first employs the intra high-speed spatial error concealment (SEC) method for the initial frame. For the succeeding inter frames, the temporal error concealment (TEC) method is applied when the adjacent external boundary matching error (AEBME) of the surrounding macroblocks is not more than the dynamic threshold ($DT_\alpha$). The intra high-speed SEC is used when AEBME is more than ($DT_\alpha$) and the surrounding macroblocks are all intra-coded, or otherwise a normal SEC method is applied.

According to the method of the present invention, methods for concealment can be optimally selected corresponding to damaged frames having different spatial redundancy information and temporal redundancy information. As such, the method of the present invention is adapted for drastically saving computation time, improving the overall image decoding efficiency, and improving the image decoding performance.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

The present invention provides a method of an efficient adaptive mode selection for H.264/AVC-coded video delivery in burst-packet-loss networks. In correspondence to damaged frames corresponding to different spatial redundancy information and temporal redundancy information, respectively, the method adaptively selects optimal error concealment methods for recovering the damaged frames, thus concealing the vision affection caused by the damaged framed to the overall image.

Among the intra high-speed SEC method, the normal SEC method, and the TEC method, which are employed in the present invention, the TEC method has the highest decoding efficiency. Therefore, the TEC method has the priority to be selected for recovering the damaged frames. However, regarding the first frame, i.e., the initial frame, there is not any temporal redundancy information available for reference, and therefore, when the first frame is damaged, the intra high-speed SEC method is selected for recovering the image data of the first frame according to correct blocks in the first frame and spatial redundancy information. Further, when the displayed scenario changes, an object appears or disappears, images move fast or irregularly, an object rotates or reforms, because of the lack of significant temporal correlation between successive frames, the TEC method cannot apply. Therefore, in this case, the intra high-speed SEC method or the normal SEC method is selected for recovering the damaged frame. When all adjacent macroblocks surrounding the missing blocks are intra-coded, the intra high-speed SEC method is selected, and or otherwise the normal SEC method is selected.

Figure 1:
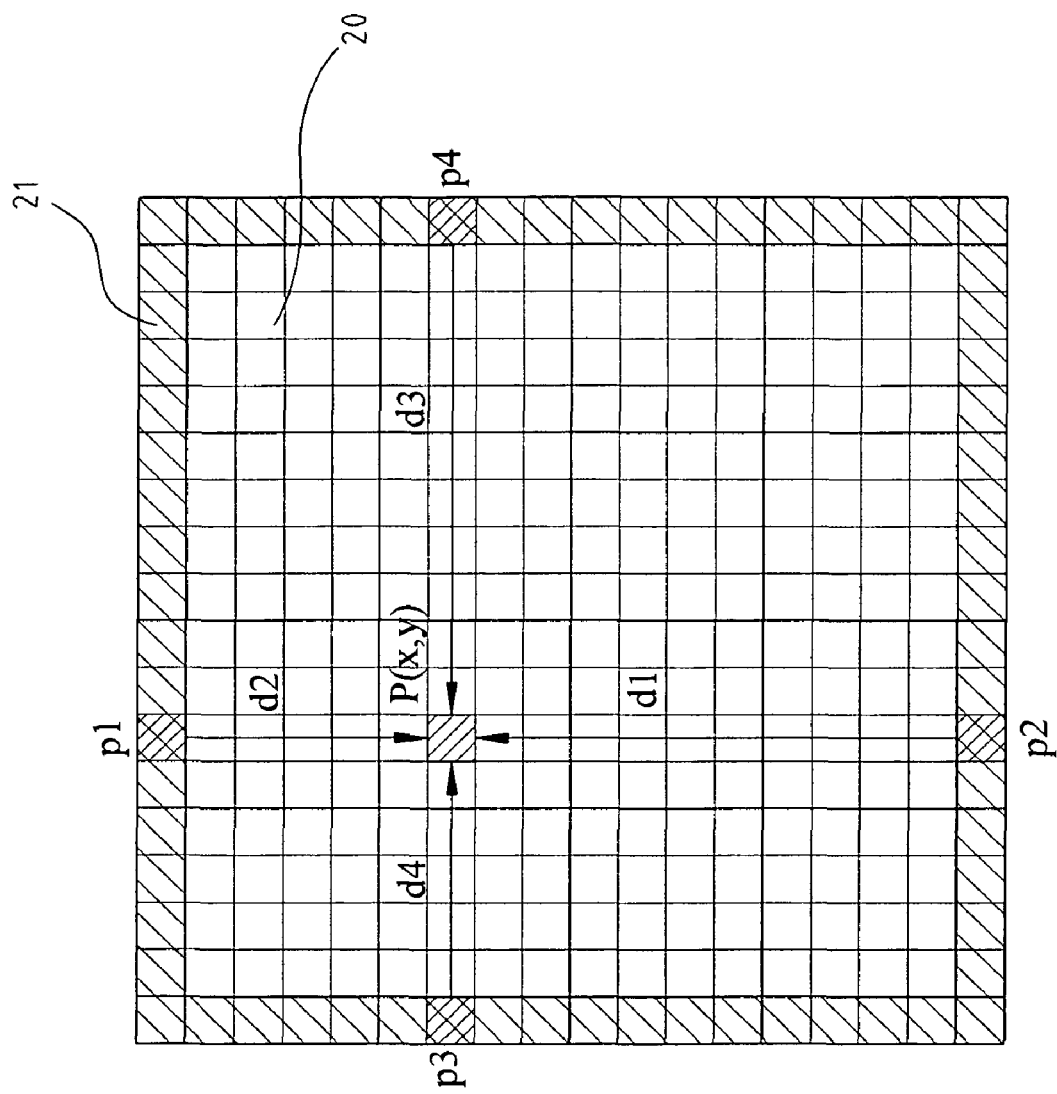
FIG. 1 is a schematic diagram illustrating a BI method according to a conventional technology.
Figure 2:
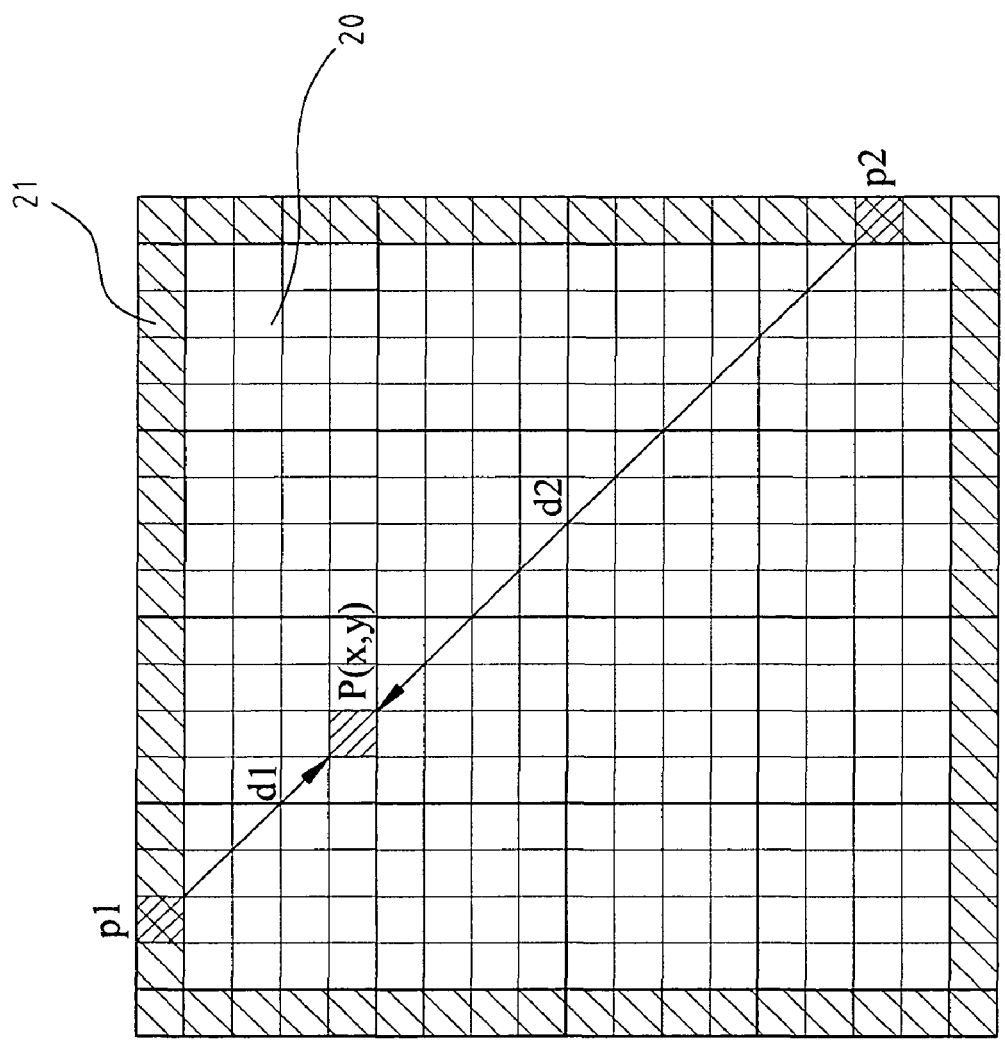
FIG. 2 is a schematic diagram illustrating a DI method according to a conventional technology.
Figure 3:
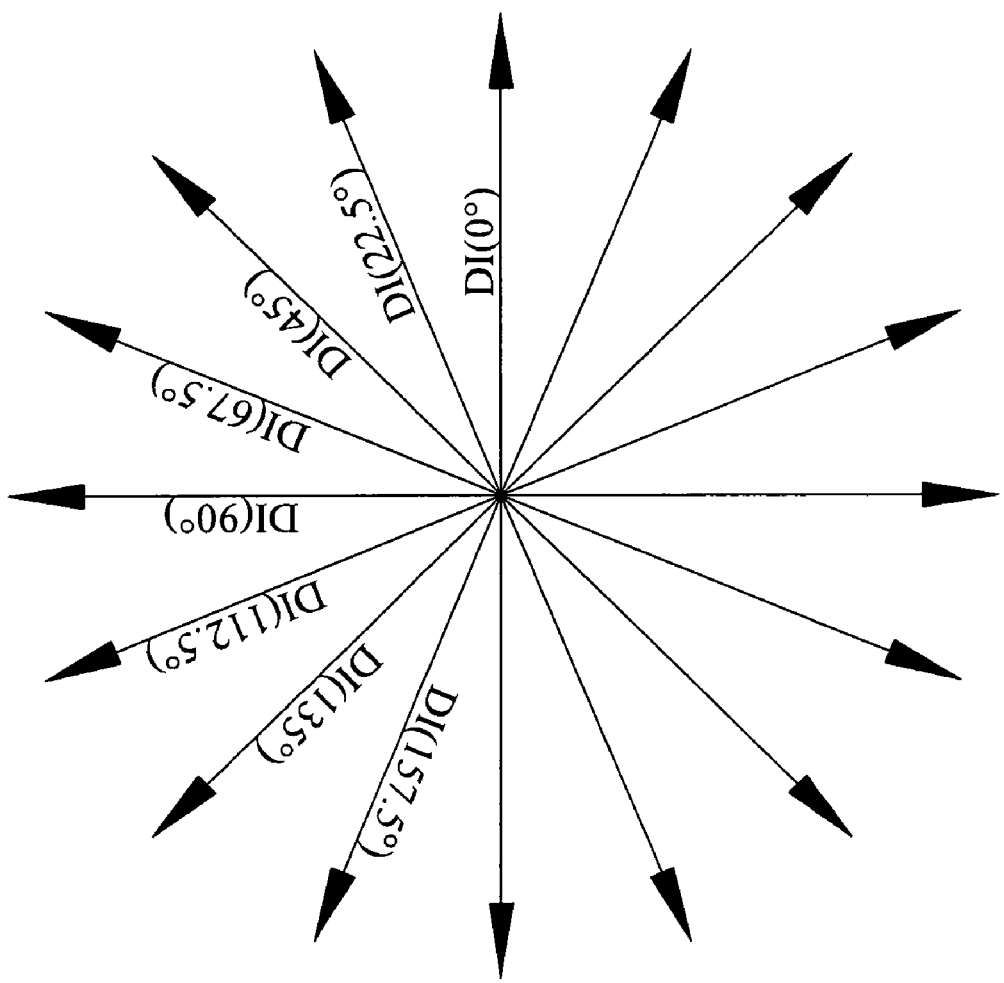
FIG. 3 is a directional schematic diagram illustrating a DI method according to a conventional technology.
Figure 4:
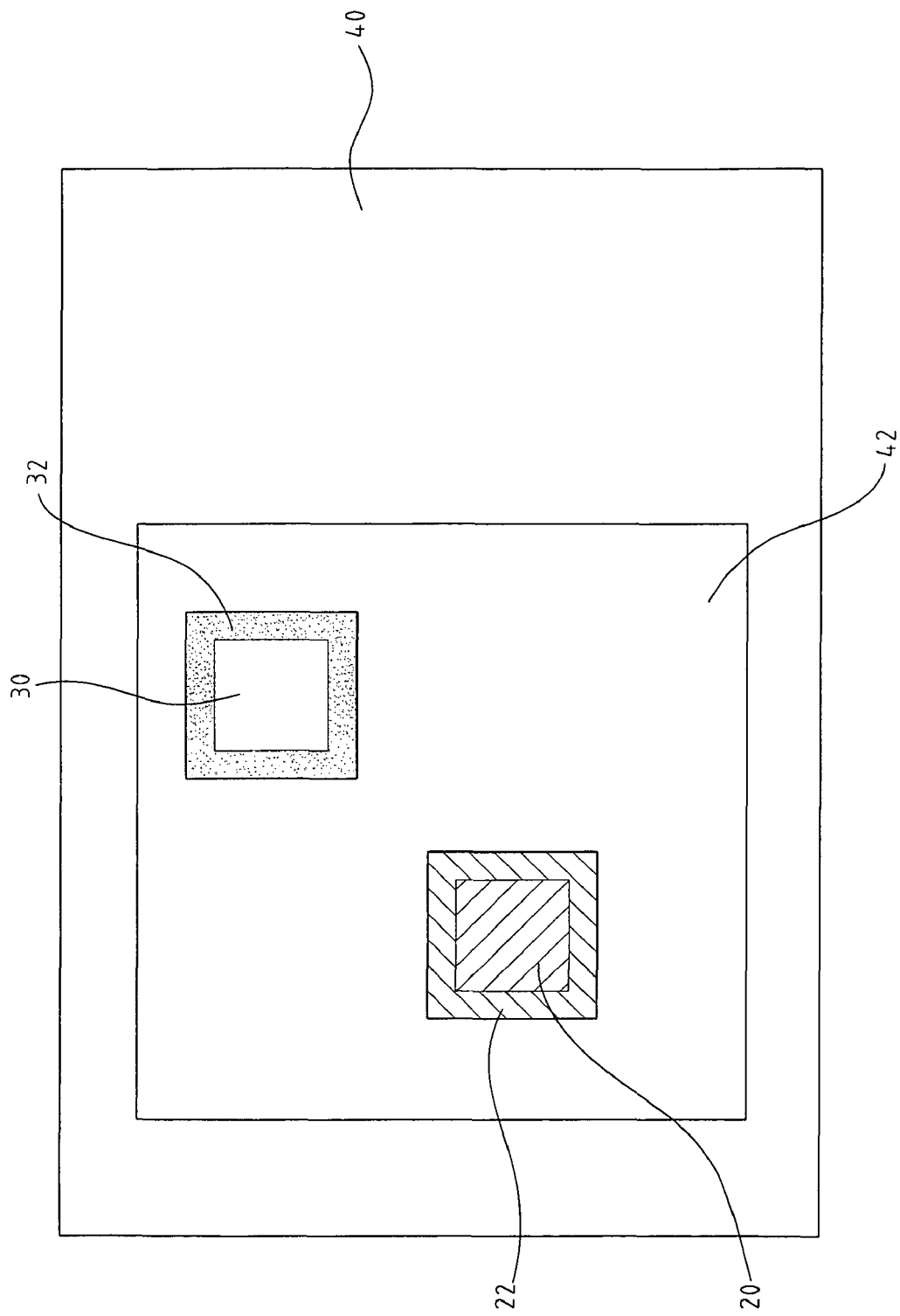
FIG. 4 is a schematic diagram illustrating a BNM method according to a conventional technology.
Figure 5:
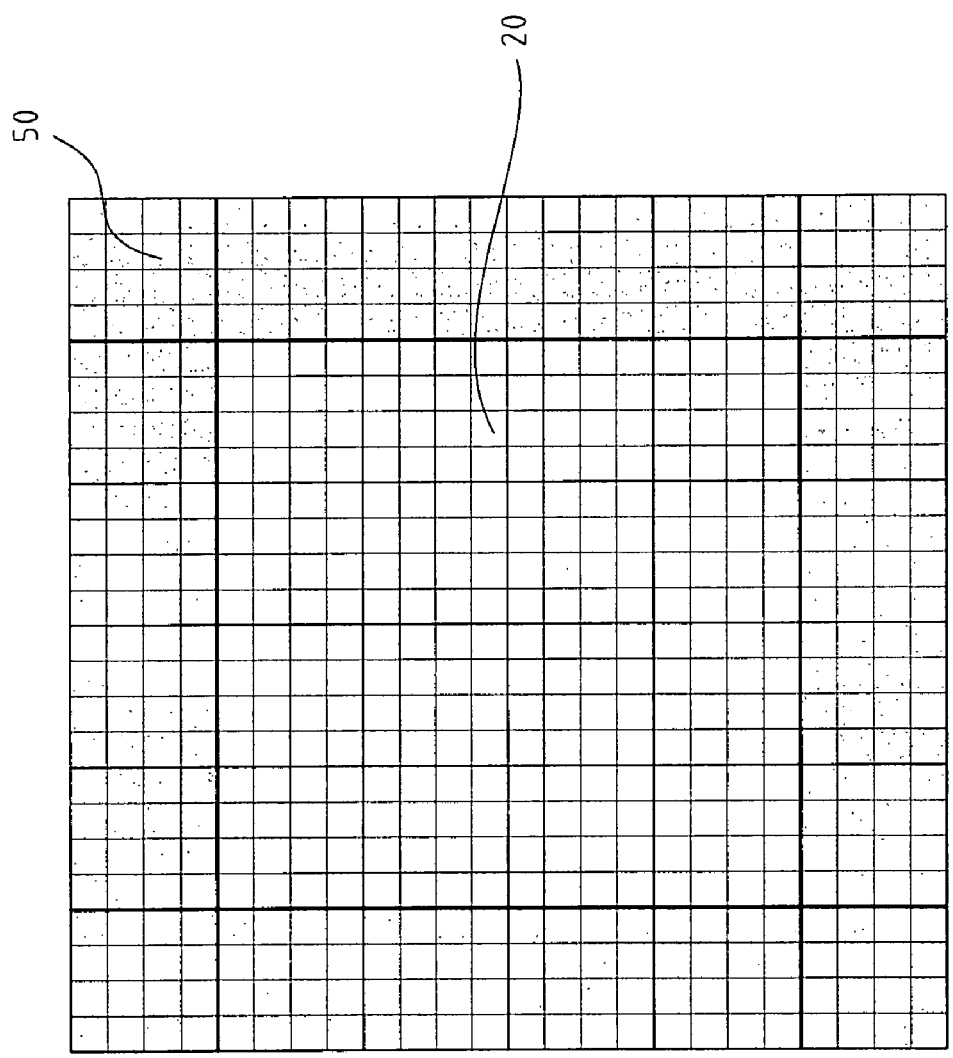
FIG. 5 is a schematic diagram illustrating reference blocks of an MDI method according to a conventional technology.
Figure 6:
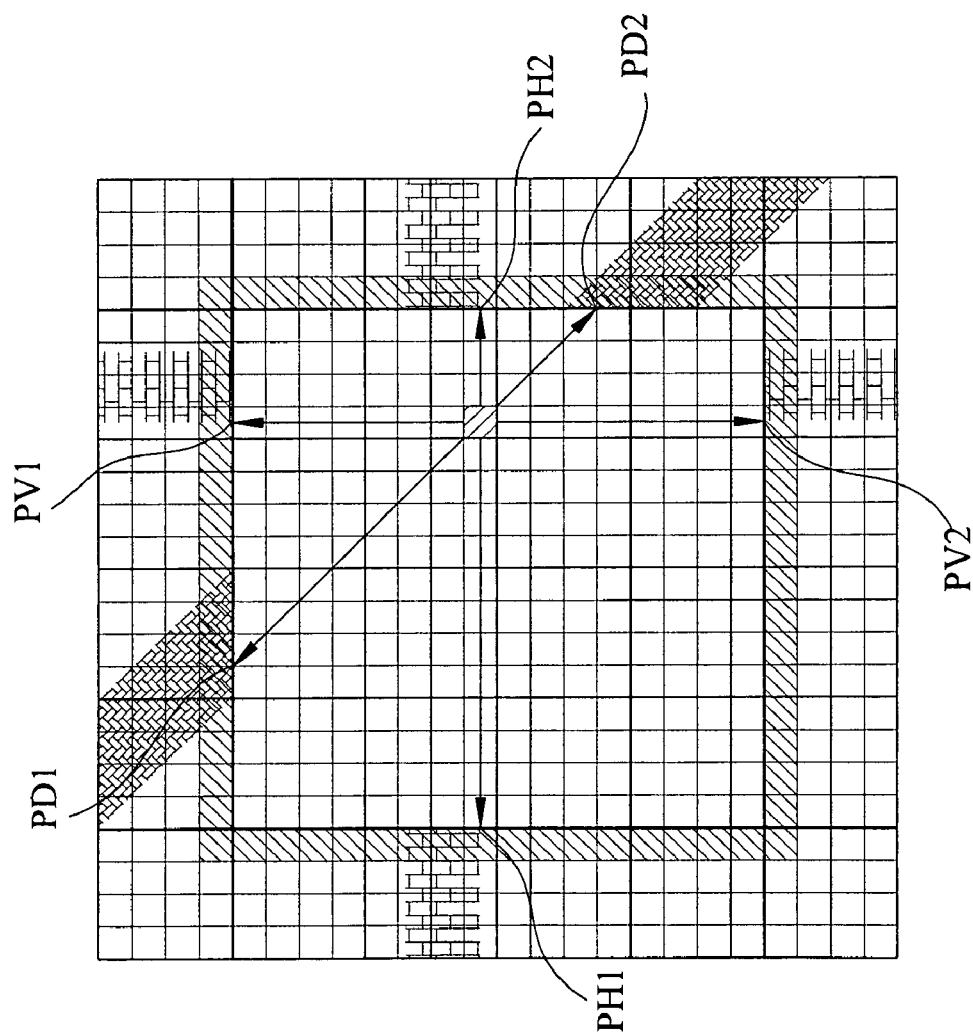
FIG. 6 is a schematic diagram illustrating a 3-directional weighting interpolation of the MDI method according to a conventional technology.
Figure 7:
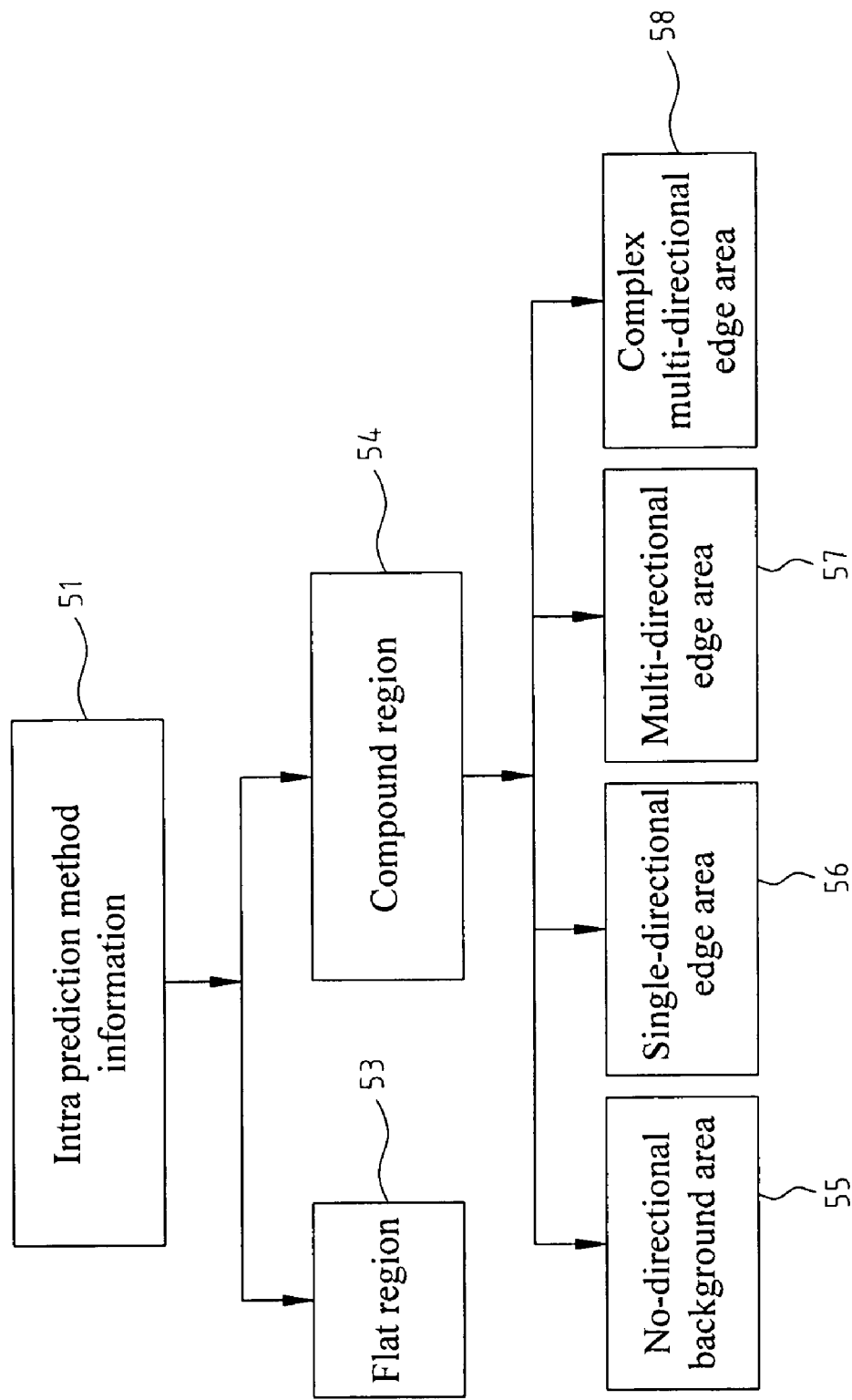
FIG. 7 is a flow chart illustrating a fast classification of a fast SEC method according to a conventional technology.
Figure 8:
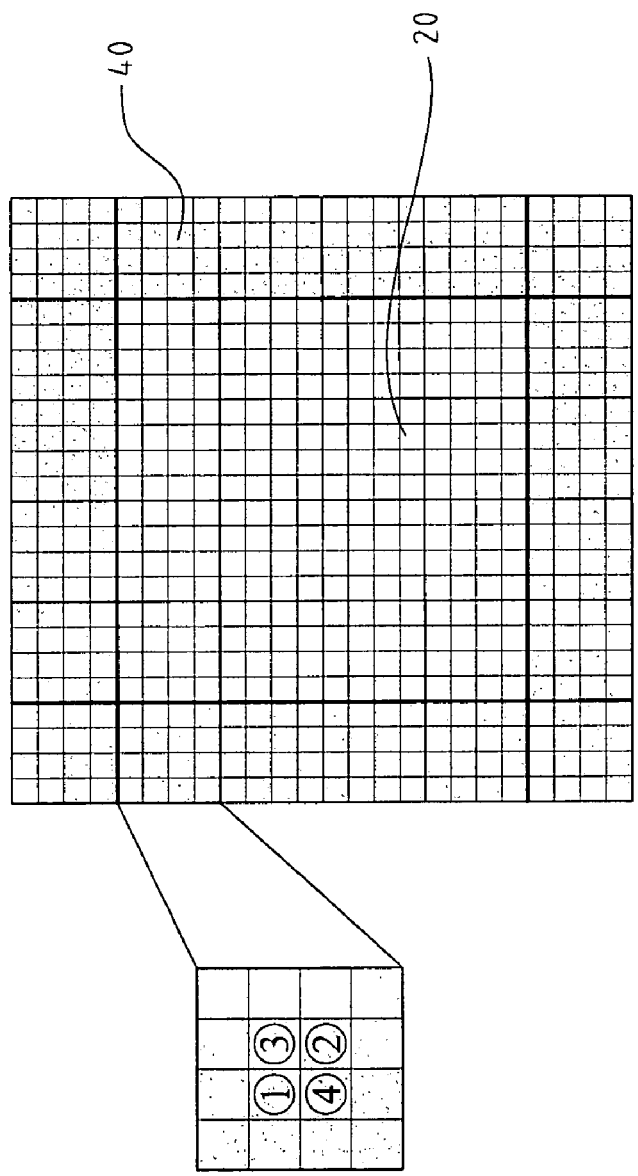
FIG. 8 is a schematic diagram illustrating a fast SEC method according to a conventional technology.
Figure 9:
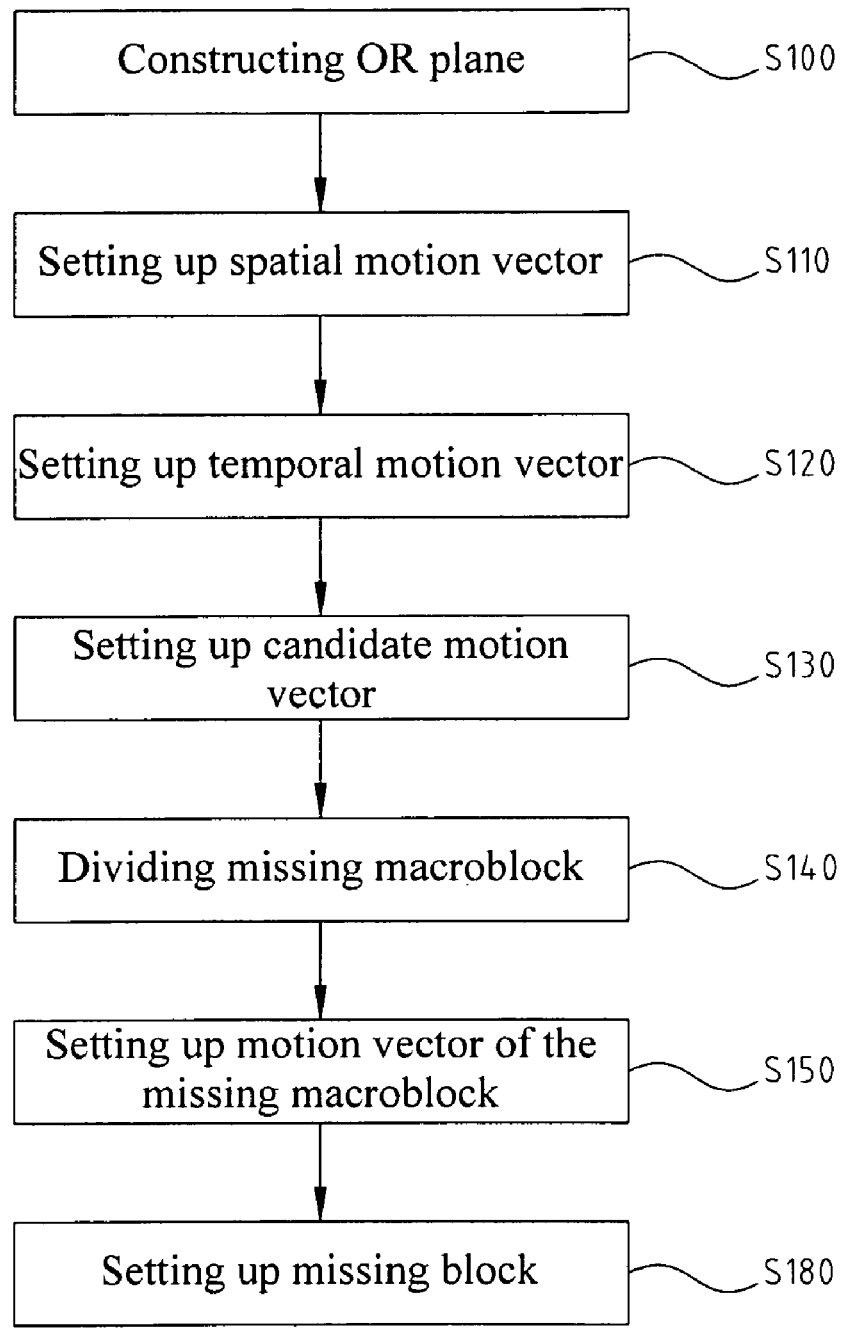
FIG. 9 is a flow chart illustrating a conventional TEC method.
Figure 10:
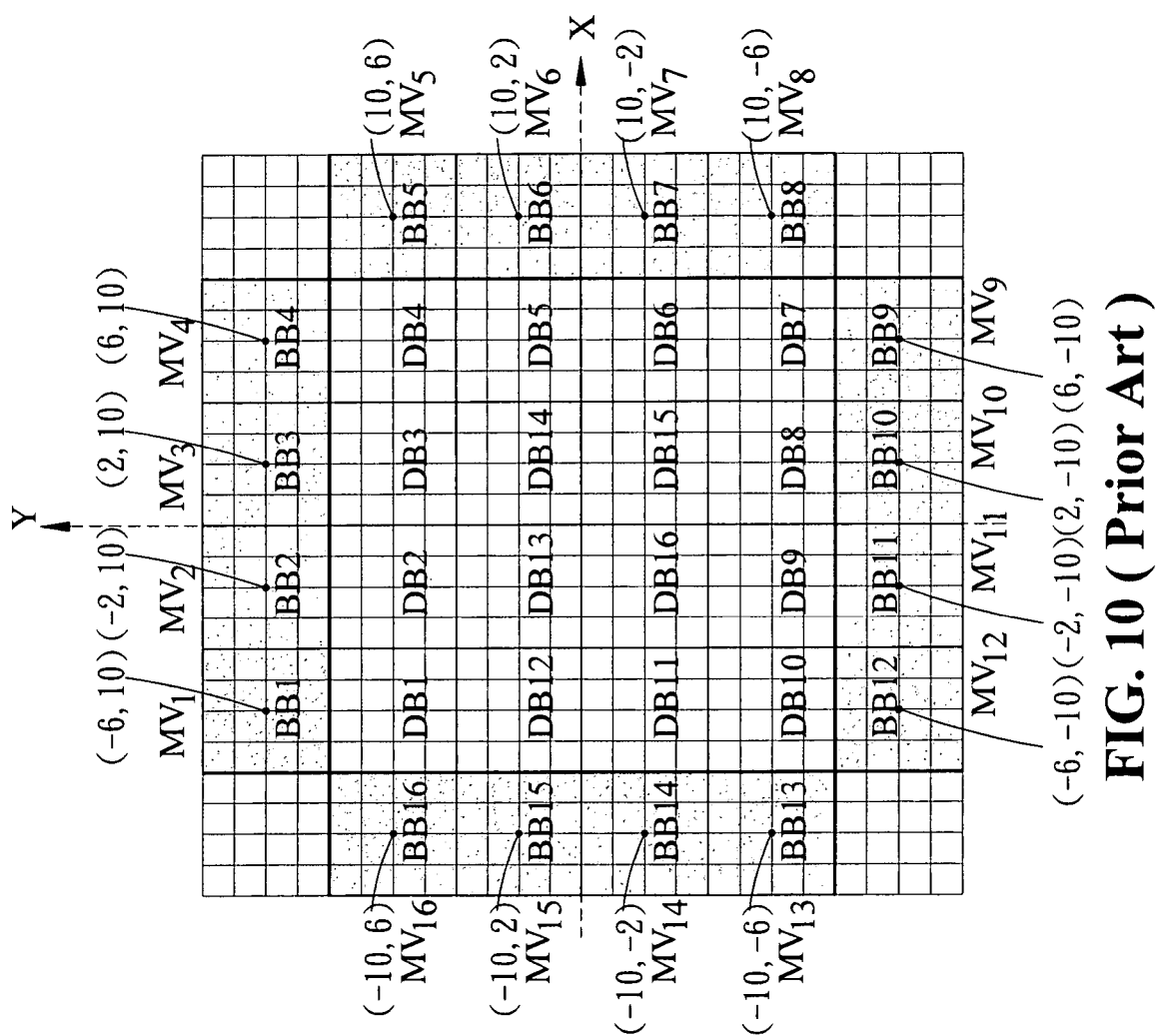
FIG. 10 is a solid view of boundary blocks according to a conventional technology.
Figure 11:
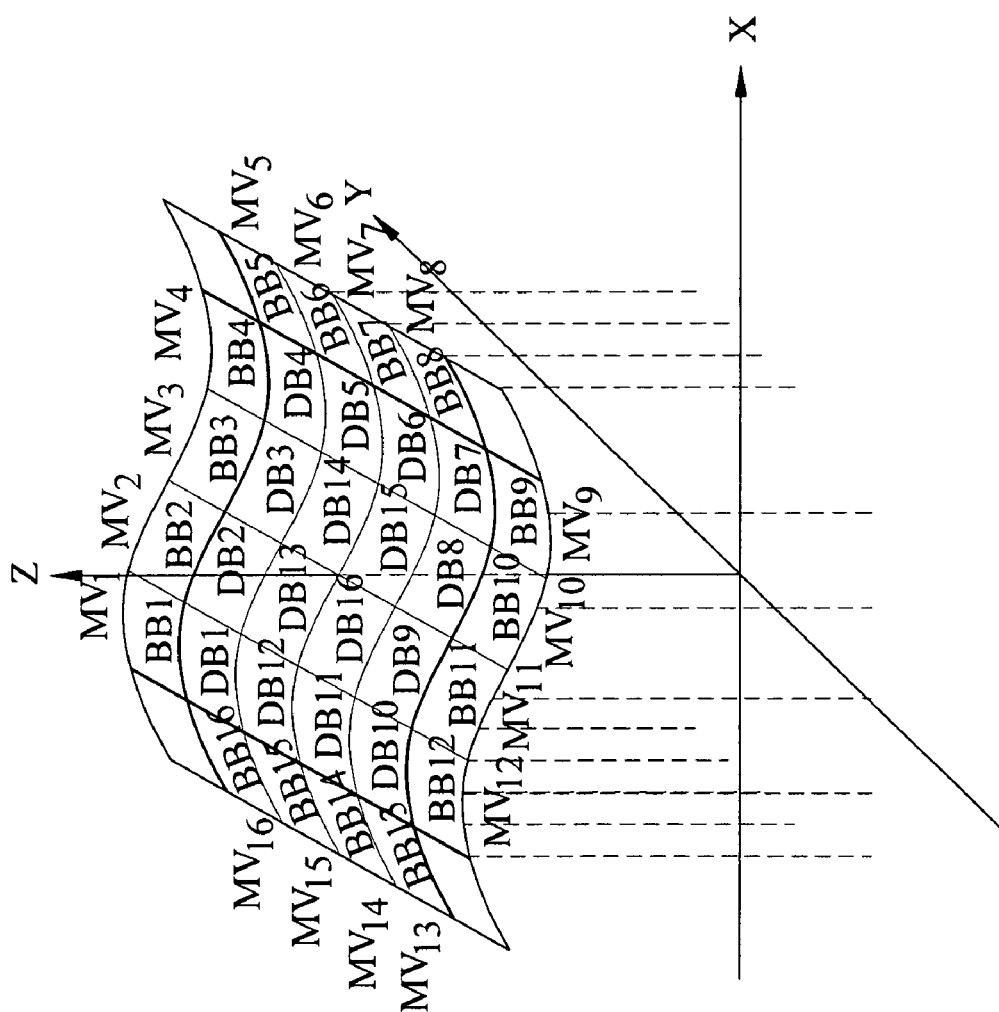
FIG. 11 is a schematic diagram illustrating boundary blocks according to a conventional technology.
Figure 12:
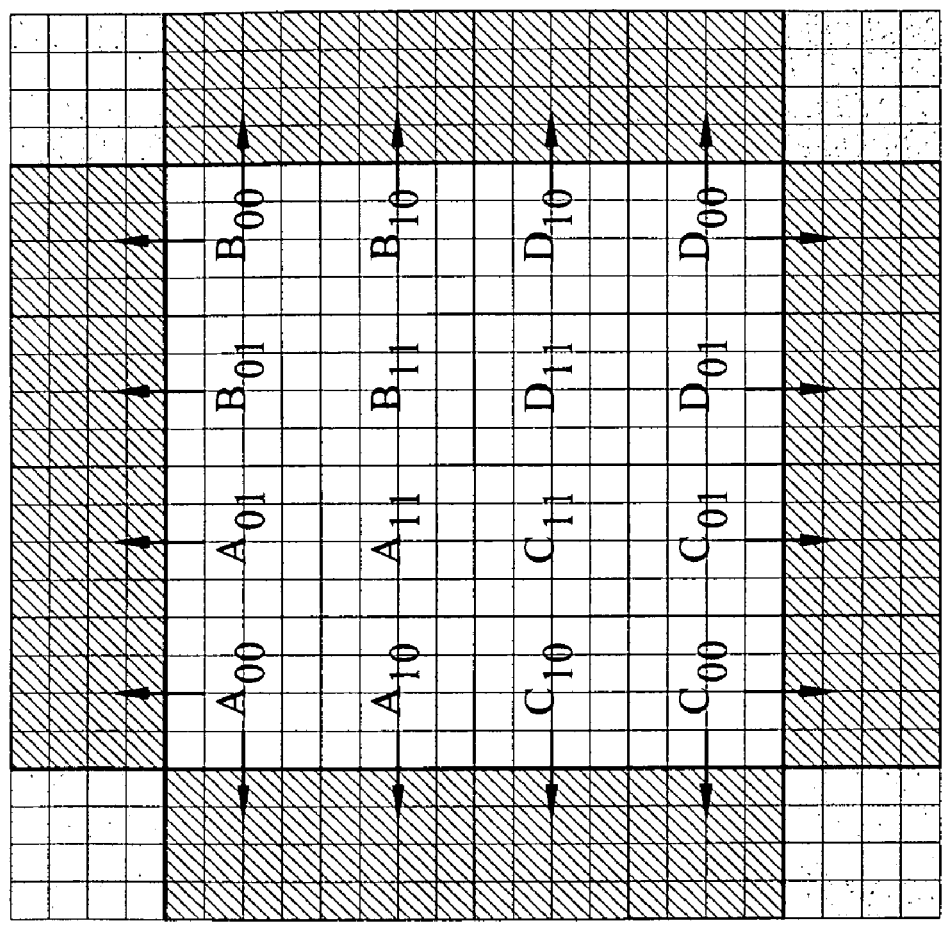
FIG. 12 is a schematic diagram illustrating a boundary matching algorithm (BMA) and related blocks according to a conventional technology.
Figure 13:
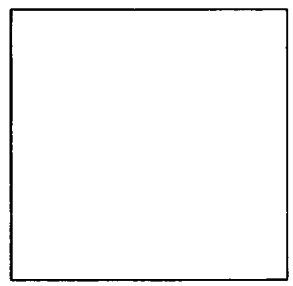
FIG. 13 is a schematic diagram illustrating boundary blocks according to a conventional technology.
Figure 13:
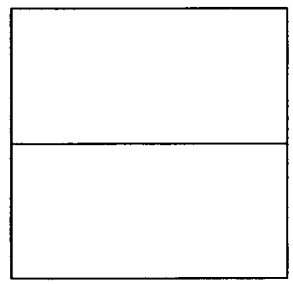
Figure 13:
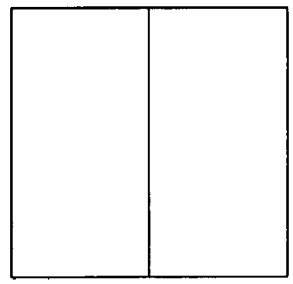
Figure 13:
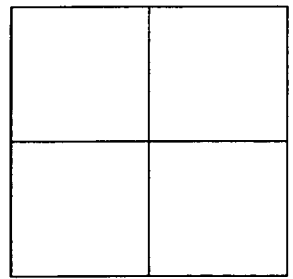
Figure 14:
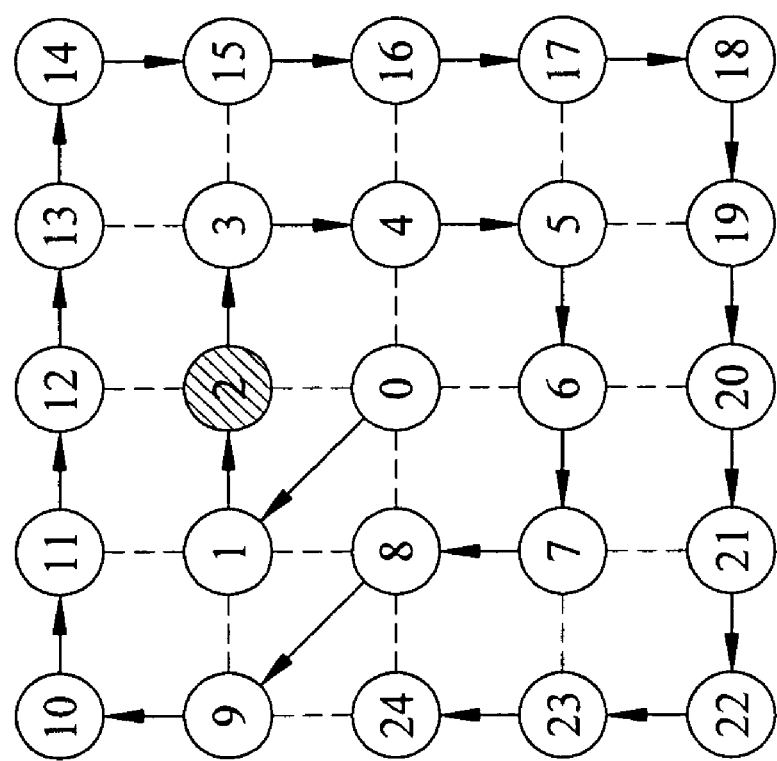
FIG. 14 is a schematic diagram illustrating a spiral scanning path according to a conventional technology.
Figure 15:
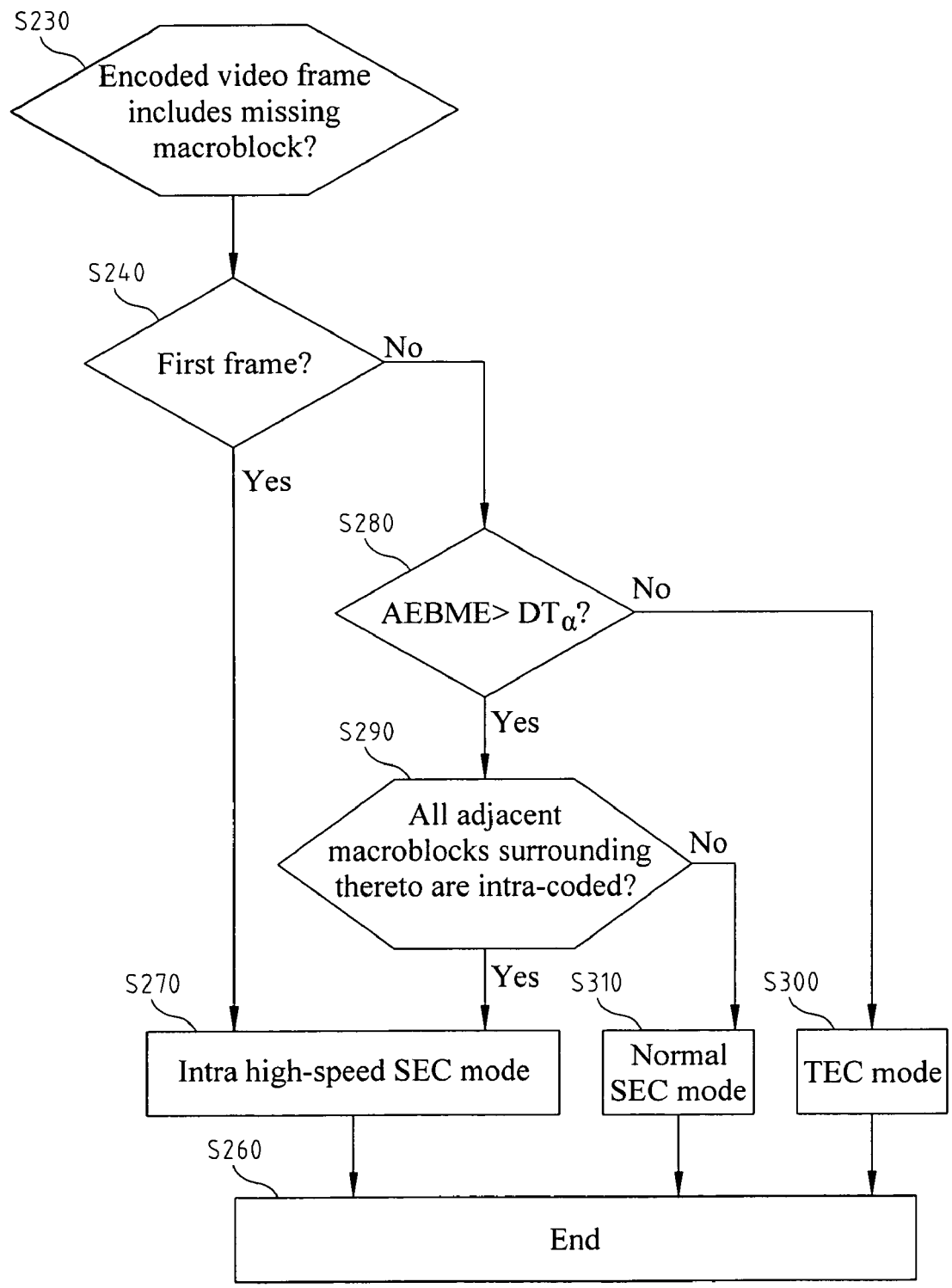
FIG. 15 is a flow chart illustrating a first embodiment of the present invention.

FIG. 15 is a flow chart illustrating a first embodiment of the present invention. The first embodiment of the present invention is adapted for processing erroneous image data generated when decoding an encoded frame of a video image sequence, in which the decoded frame is concealment processed with one selected from the TEC method, the normal SEC method, and the intra high-speed SEC method.

Referring to FIG. 15, the method according to the first embodiment of the present invention starts from step S230. When the decoded image frame includes a missing macroblock, at step S230, the concealment process starts, and the flow enters S240. At step S240, it is determined that whether the processed frame is the first frame, i.e., the initial frame. If the processed frame is the first frame, then the flow enters step S270, or otherwise if the processed frame is not the first frame, the flow enters step S280. At step S270, the intra high-speed SEC method is selected for recovering the missing macroblock, and then the flow enters step S260 where the decoding process ends. At step S280, it is determined whether an adjacent external boundary matching error (AEBME) is greater than a dynamic threshold ($DT_\alpha$). If it is determined that the AEBME is greater than the dynamic threshold ($DT_\alpha$), then the flow enters step S290, or otherwise, the flow enters step S300. At step S290, it is determined whether all adjacent macroblocks surrounding the missing macroblock are all intra-coded. If it is determined that all adjacent macroblocks surrounding the missing macroblock are all intra-coded, then the flow enters step S270, or otherwise, the flow enters step S310. At step S300, the TEC method is selected for recovering the missing macroblock, and then the flow enters step S260, where the decoding process ends. At step S310, the normal SEC method is selected for recovering the missing macroblock, and then the flow enters step S260, where the flow ends.

The AEBME is defined by the equations (11) and (12), and the dynamic threshold ($DT_\alpha$) is defined by the equation (19), and are not to be iterated hereby.

Figure 16:
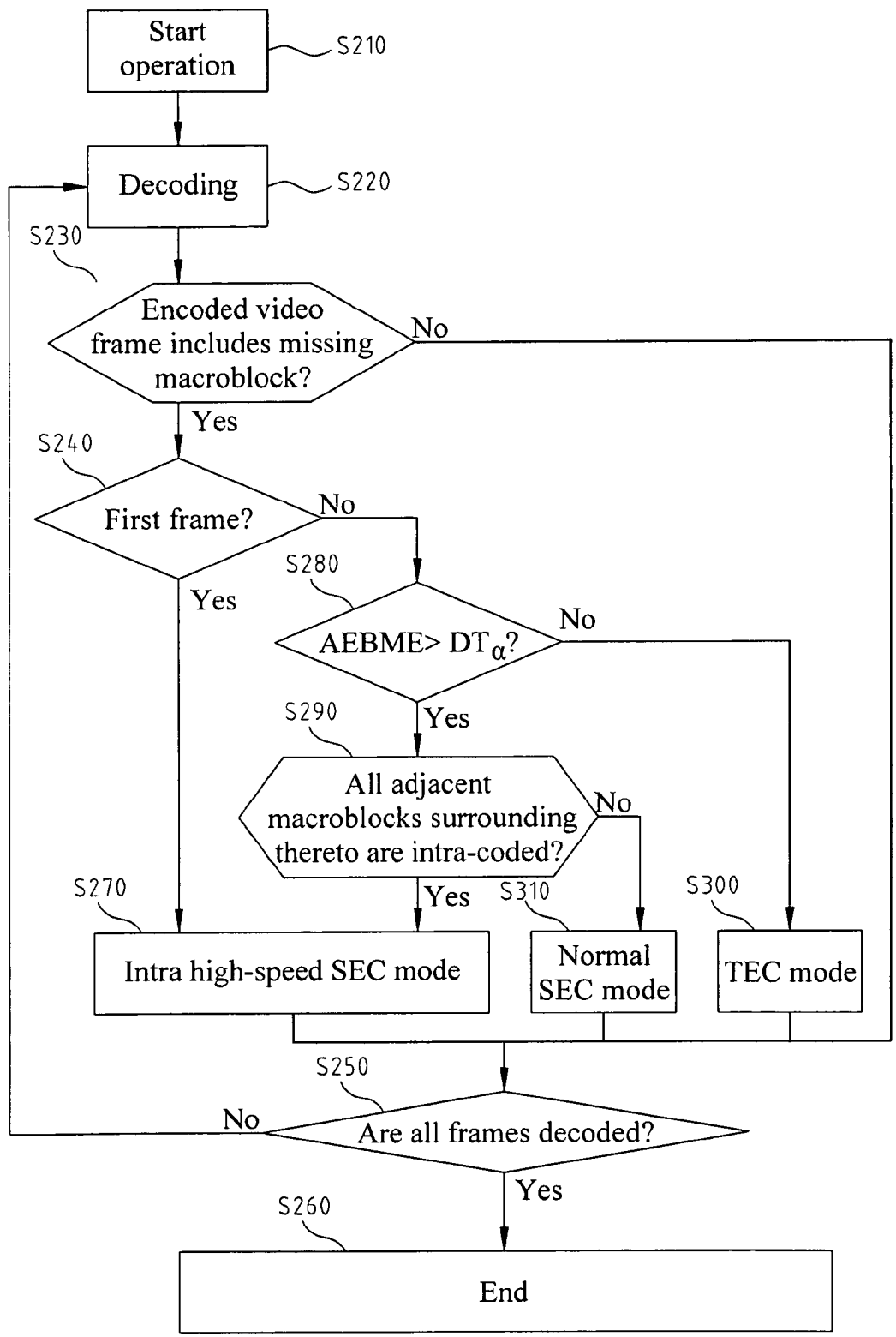
FIG. 16 is a flow chart illustrating a second embodiment of the present invention.

FIG. 16 is a flow chart illustrating a second embodiment of the present invention. The second embodiment of the present invention is adapted for processing erroneous image data generated when decoding the entirety of a video image sequence, in which all decoded frames are concealment processed with one selected from the TEC method, the normal SEC method, and the intra high-speed SEC method.

Referring to FIG. 16, the method according to the second embodiment of the present invention starts from step S210, where the flow starts, then the flow enters step S220. At step S220, image data of encoded frames are decoded to generate decoded video frames, then the flow enters step S230. At step S230, it is determined that whether the decoded video frames include a missing macroblock. If it is determined that the decoded video frames include a missing macroblock, then the flow enters step S240, or otherwise, the flow enters step S250. At step S250, it is determined whether all of the frames are decoded. If it is determined that all of the frames are decoded, then the flow enters step S260, where the decoding process ends, or otherwise the flow returns back to step S220 to decoding image data of the rest frames. At step S240, it is determined that whether the processed frame is the first frame, i.e., the initial frame. If the processed frame is the first frame, then the flow enters step S270, or otherwise if the processed frame is not the first frame, the flow enters step S280. At step S270, the intra high-speed SEC method is selected for recovering the missing macroblock, and then the flow enters step S250 for determining whether all of the frames are decoded. If it is determined that all of the frames are decoded. At step S280, it is determined whether the adjacent external boundary matching error (AEBME) is greater than the dynamic threshold ($DT_\alpha$). If it is determined that the AEBME is greater than the dynamic threshold ($DT_\alpha$), then the flow enters step S290, or otherwise, the flow enters step S300. At step S290, it is determined whether all adjacent macroblocks surrounding the missing macroblock are all intra-coded. If it is determined that all adjacent macroblocks surrounding the missing macroblock are all intra-coded, then the flow enters step S270, or otherwise, the flow enters step S310. At step S300, the TEC method is selected for recovering the missing macroblock, and then the flow enters step S250 for determining whether all of the frames are decoded. If it is determined that all of the frames are decoded. At step S310, the normal SEC method is selected for recovering the missing macroblock, and then the flow enters step S250 for determining whether all of the frames are decoded.

It has been experimentally proved that the method provided by the present invention can achieve a gain much higher than the decoder provided by the reference software Joint Model (JM) of the H.264 standard, for about 10.62 dB, without requiring for additional time regarding a large range basic sequence. The reference software 1M is provided by the joint video team of ISO/IEC MPEG and ITU-T VCEG (JVT association).

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A hybrid error concealment method adapted for H.264/AVC-coded video delivery in burst-packet-loss networks for effectively selecting one from a TEC method, a normal SEC method, and an intra high-speed SEC method for concealment processing erroneous image data caused by lost packets when decoding an encoded image frame of a video image sequence, the video image sequence comprising a plurality of encoded image frames, the TEC method utilizing a temporal redundancy information, the normal SEC method utilizing a spatial redundancy information, and the intra high-speed SEC method utilizing a directional information for promptly obtaining a possible directional angle and a possible directional gradient, the hybrid error concealment method comprising the steps of:

Step A: starting concealment processing the erroneous image data, when the decoded image frame contains a missing macroblock, and then entering step B, wherein the missing macroblock comprises the erroneous image data generated when decoding the video image sequence;

Step B: when the encoded frame is a first encoded image frame of the video image sequence, entering step C; or when the encoded frame is not the first encoded image frame of the video image sequence, then entering step D;

Step C: selecting the intra high-speed SEC method for recovering the missing macroblock, and entering step H;

Step D: entering step E, if an adjacent external boundary matching error (AEBME) is greater than a dynamic threshold ($DT_\alpha$), or entering step F, if the AEBME is not greater than the dynamic threshold ($DT_\alpha$);

Step E: entering step C, if all adjacent macroblocks surrounding the missing macroblock are intra-coded, or entering step G, if the adjacent macroblocks surrounding the missing macroblock are not all intra-coded;

Step F: selecting the TEC method for recovering the missing macroblock, and then entering step H;

Step G: selecting the normal SEC method for recovering the missing block, and then entering step H; and Step H: ending the concealment processing,
wherein the missing macroblock comprises a plurality of missing blocks, one missing block A00 of the missing blocks is positioned at a corner of the missing macroblock, and another one missing block A10 of the missing blocks is not positioned at any corner of the missing macroblock and is positioned neighboring with an external boundary block.

2. The hybrid error concealment method according to claim 1, wherein the dynamic threshold ($DT_\alpha$) is defined as:

$$DT_\alpha = \mu + N \times \alpha,$$

wherein N is the total number of pixels, µ represents an original residual value of the SADs (sum of absolute difference) and α is a real number ranging from 0 to 1.

3. The hybrid error concealment method according to claim 1, wherein the AEBME is a minimum of matching errors between the missing blocks and the external adjacent boundary blocks.

4. The hybrid error concealment method according to claim 1, wherein the AEBME of the missing block A00 is AEBME00 defined as:

$$AEBME_{00} = \sum_{i=1}^{M} \sum_{x=x_0}^{x_0+N-1} |A_{00}(x, y_0+i) - R(x+v, y_0+i+u)| + \sum_{i=1}^{M} \sum_{y=y_0}^{y_0-(N-1)} |A_{00}(x_0-i, y) - R(x_0-i+v, y+u)|,$$

wherein $A_{00}(x, y)$ represents pixels of the missing block A00, $R(x, y)$ represents pixels of a previous decoded frame of the decoded image frame, $(x_0, y_0)$ represents the coordinate of the missing block A00, $(v, u)$ represents a spatial motion vector or a temporal motion vector of an external adjacent boundary block, N represents an amount of the missing blocks, and M represents a pixel width of the external boundary block.

5. The hybrid error concealment method according to claim 1, wherein the AEBME of the missing block A10 is AEBME10 defined as:

$$AEBME_{10} = \sum_{i=1}^{M} \sum_{y=y_0}^{y_0-(N-1)} |A_{10}(x_0-i, y) - R(x_0-i+v, y+u)|,$$

wherein $A10(x, y)$ represents pixels of the missing block A10, $R(x, y)$ represents pixels of a previous decoded frame of the decoded image frame, $(x_0, y_0)$ represents the coordinate of the missing block A00, $(v, u)$ represents a spatial motion vector or a temporal motion vector of an external adjacent boundary block, N represents an amount of the missing blocks, and M represents a pixel width of the external boundary block.

6. A hybrid error concealment method adapted for H.264/AVC-coded video delivery in burst-packet-loss networks for effectively selecting one from a TEC method, a normal SEC method, and an intra high-speed SEC method for concealment processing erroneous image data caused by lost packets when decoding a plurality of encoded image frame of a video image sequence, the TEC method utilizing a temporal redundancy information, the normal SEC method utilizing a spatial redundancy information, and the intra high-speed SEC method utilizing a directional information for promptly obtaining a possible directional angle and a possible directional gradient, the hybrid error concealment method comprising the steps of:

Step A: starting a decoding process, and entering step B;

Step B: decoding one of the encoded image frames for obtaining a decoded image frame, wherein the decoded image frame comprises a plurality of macroblocks, and each of the macroblocks comprises a plurality of pixel data, and then entering step C;

Step C: entering step D, if the decoded image frame contains a missing macroblock, or entering step E, if the decoded image frame does not contain a missing macroblock, wherein the missing macroblock comprises the erroneous image data generated when decoding the video image sequence;

Step D: entering step F, if the encoded frame is a first encoded image frame of the video image sequence, or entering step G, if the encoded frame is not the first encoded image frame of the video image sequence;

Step E: entering step K, if all of the encoded image frame have been decoded, or returning back to step B, if there is one encoded image frame not decoded;

Step F: selecting the intra high-speed SEC method for recovering the missing macroblock, and entering step E;

Step G: entering step H, if an adjacent external boundary matching error (AEBME) is greater than a dynamic threshold ($DT_\alpha$), or entering step I, if the AEBME is not greater than the dynamic threshold ($DT_\alpha$);

Step H: entering step F, if all adjacent macroblocks surrounding the missing macroblock are intra-coded, or entering step J, if the adjacent macroblocks surrounding the missing macroblock are not all intra-coded;

Step I: selecting the TEC method for recovering the missing macroblock, and then entering step E;

Step J: selecting the normal SEC method for recovering the missing block, and then entering step E; and Step K: ending the decoding process,
wherein the missing macroblock comprises a plurality of missing blocks, one missing block A00 of the missing blocks is positioned at a corner of the missing macroblock, and another one missing block A10 of the missing blocks is not positioned at any corner of the missing macroblock and is positioned neighboring with an external boundary block.

7. The hybrid error concealment method according to claim 6, wherein the dynamic threshold ($DT_\alpha$) is defined as:

$$DT_\alpha = \mu + N \times \alpha,$$

wherein N is the total number of pixels, µ represents an original residual value of the SADs (sum of absolute difference) and α is a real number ranging from 0 to 1.

8. The hybrid error concealment method according to claim 6, wherein the AEBME is a minimum of matching errors between the missing blocks and the external adjacent boundary blocks.

9. The hybrid error concealment method according to claim 6, wherein the AEBME of the missing block A00 is AEBME00 defined as:

$$AEBME_{00} = \sum_{i=1}^{M} \sum_{x=x_0}^{x_0+N-1} |A_{00}(x, y_0 + i) - R(x + v, y_0 + i + u)| +$$

$$\sum_{i=1}^{M} \sum_{y=y_0}^{y_0-(N-1)} |A_{00}(x_0 - i, y) - R(x_0 - i + v, y + u)|,$$

wherein $A_{00}(x, y)$ represents pixels of the missing block A00, $R(x, y)$ represents pixels of a previous decoded frame of the decoded image frame, $(x_0, y_0)$ represents the coordinate of the missing block A00, $(v, u)$ represents a spatial motion vector or a temporal motion vector of an external adjacent boundary block, N represents an amount of the missing blocks, and M represents a pixel width of the external boundary block.

10. The hybrid error concealment method according to claim 6, wherein the AEBME of the missing block A10 is AEBME10 defined as:

$$AEBME_{10} = \sum_{i=1}^{M} \sum_{y=y_0}^{y_0-(N-1)} |A_{10}(x_0 - i, y) - R(x_0 - i + v, y + u)|,$$

wherein $A_{10}(x, y)$ represents pixels of the missing block A10, $R(x, y)$ represents pixels of a previous decoded frame of the decoded image frame, $(x_0, y_0)$ represents the coordinate of the missing block A00, $(v, u)$ represents a spatial motion vector or a temporal motion vector of an external adjacent boundary block, N represents an amount of the missing blocks, and M represents a pixel width of the external boundary block.

\* \* \* \* \*